(12) United States Patent  
Fujii (10) Patent No.: US 6,647,240 B2  
(45) Date of Patent: Nov. 11, 2003

(54) ORIGINAL FEEDING APPARATUS HAVING A PLURALITY OF SENSORS

(75) Inventor: Takayuki Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/093,028

(22) Filed: Mar. 8, 2002

(65) Prior Publication Data

US 2002/0127037 A1 Sep. 12, 2002

(30) Foreign Application Priority Data

Mar. 12, 2001 (JP) ........................................ 2001-068473

(51) Int. Cl.[7] .............................. B65H 1/00; G03G 15/00
(52) U.S. Cl. ........................ 399/371; 271/259; 399/17
(58) Field of Search .............................. 399/16, 17, 365, 399/367, 371; 271/3.15, 258.01, 259, 265.01, 265.02

(56) References Cited

U.S. PATENT DOCUMENTS

| | | | |
|---|---|---|---|
| 3,909,128 A | * 9/1975 | Sohm | 399/371 X |
| 4,310,153 A | 1/1982 | Kikuchi | 271/259 |
| 4,740,686 A | 4/1988 | Nusser | 250/214 R |
| 5,283,424 A | 2/1994 | Acquaviva et al. | 250/205 |
| 5,875,033 A | 2/1999 | Kawata et al. | 358/296 |
| 5,905,933 A | 5/1999 | Murai | 399/376 |
| 6,021,305 A | 2/2000 | Sato et al. | 399/374 |
| 6,098,977 A | 8/2000 | Sato et al. | 271/186 |
| 6,131,898 A | 10/2000 | Hiroi et al. | 271/10.03 |
| 6,203,003 B1 | 3/2001 | Sato et al. | 271/3.01 |

FOREIGN PATENT DOCUMENTS

JP  2000-289885  10/2000

* cited by examiner

*Primary Examiner*—Sophia S. Chen  
(74) *Attorney, Agent, or Firm*—Fitzpatrick, Cella, Harper & Scinto (57) ABSTRACT

An original feeding apparatus has a sensor for detecting an original by a light emitting element and a light receiving element. A first detector for detecting presence/absence of a sheet, and a second detector capable of being electrically switched between a detection possible condition that the presence/absence of the sheet can be detected and a detection impossible condition that the presence/absence of the sheet cannot be detected are provided and the second sensor is switched to the detection impossible condition when presence of the original is detected by the first detector.

13 Claims, 9 Drawing Sheets

ORIGINAL FEEDING APPARATUS HAVING A PLURALITY OF SENSORS

BACKGROUND OF THE INVENTION

1. Field of the Invention

The present invention relates to an original feeding apparatus having a plurality of sensors for detecting an original.

2. Related Background Art

Some conventional original feeding apparatus to be mounted to a copying machine have a plurality of sensors and a plurality of motors. Recently, as sensors provided on an original tray and in an original convey path, a sensor in which a light emitting element and a light receiving element are arranged so that light emitted from the light emitting element is reflected by an original and then is received by the light receiving element or a sensor in which a light emitting element and a light receiving element are arranged so that light from the light emitting element to the light receiving element is blocked by an original has been used. In sensors of type in which paper such as an original exists between the light emitting element and the light receiving element, since paper powder can easily be accumulated on the light emitting element or the light receiving element, control is effected in such a manner that a light emitting amount of the light emitting element is increased if a light receiving amount of the light receiving element is decreased by influence of the paper powder.

However, while electric power is being supplied to the original feeding apparatus, high electrical current must continue to be flown in order to enhance the light emitting amount of the light emitting element, with the result that a service life of the light emitting element may be shortened. Japanese Patent Application Laid-Open No. 2000-289885 discloses an original feeding apparatus having a sensor including a light emitting element and a light receiving element and teaches the fact that the original feeding apparatus is provided with a logic type power supply including a sensor and a power type power supply including a motor, and the power type power supply is turned OFF when an original is not set on an original tray. But, since it is assumed that the logic type power supply is always turned ON, although effect regarding power consumption is excellent, a problem regarding a service life has not yet been solved.

SUMMARY OF THE INVENTION

An object of the present invention is to provide an original feeding apparatus in which the above-mentioned problem is solved.

Another object of the present invention is to provide a sheet feeding apparatus comprising a first detector for detecting presence/absence of a sheet, a second detector capable of being electrically switched between a detection possible condition that the presence/absence of the sheet can be detected and a detection impossible condition that the presence/absence of the sheet cannot be detected, and a controller for changing the second detector to the detection impossible condition even when the first detector is in a detection possible condition.

A further object of the present invention is to provide an original feeding apparatus comprising a first detector for detecting presence/absence of an original, a second detector capable of being electrically switched between a detection possible condition that the presence/absence of the original can be detected and a detection impossible condition that the presence/absence of the original cannot be detected, and a controller for changing the second detector to the detection impossible condition even when the first detector is in a detection possible condition.

The other objects and features of the present invention will be apparent from the following detailed explanation referring to the accompanying drawings.

DETAILED DESCRIPTION OF THE PREFERRED EMBODIMENTS

Figure 1:
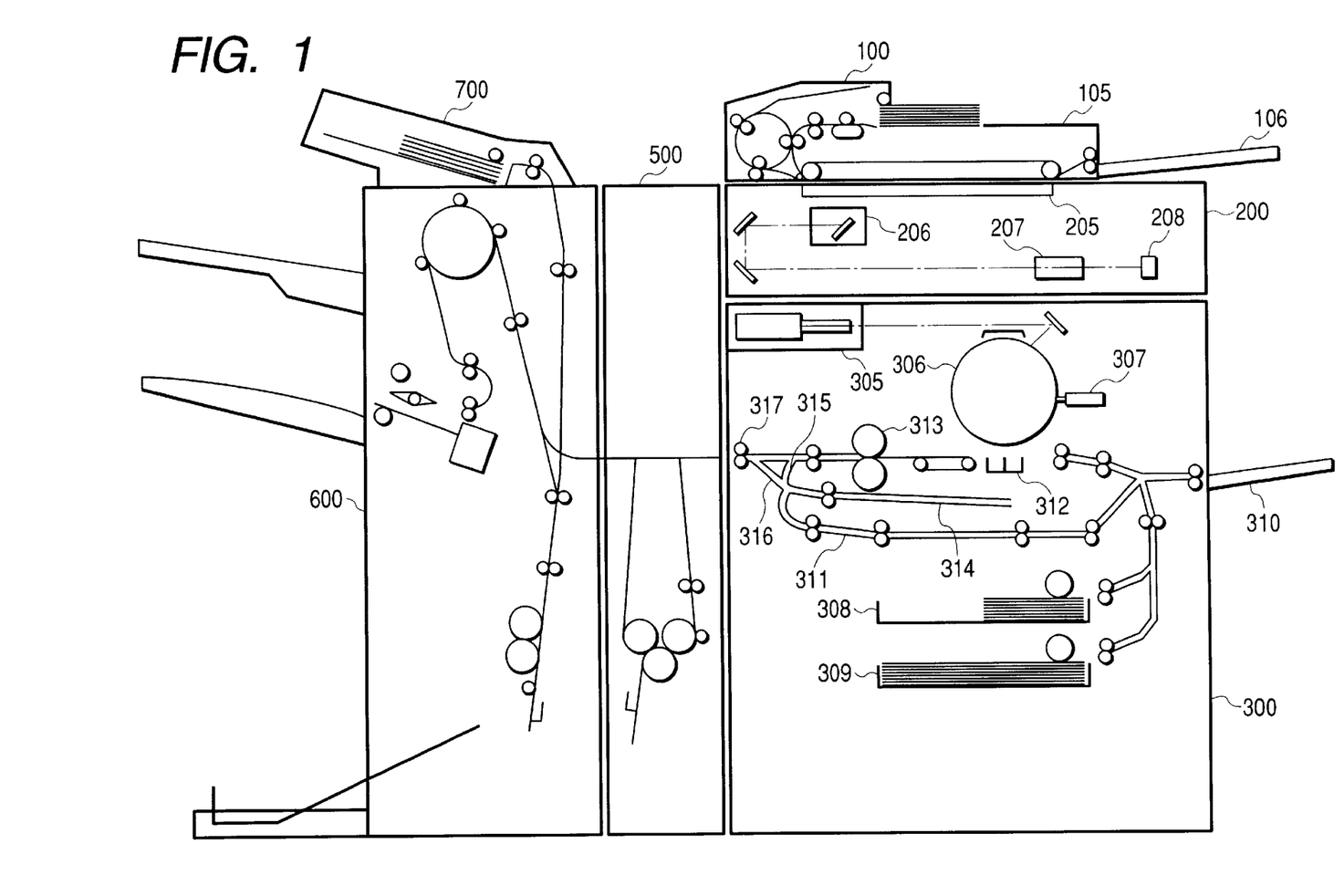
FIG. 1 is a view showing a construction of an image forming apparatus.

First of all, an embodiment of an image forming apparatus of the present invention will be explained. FIG. 1 is a view showing a construction of the image forming apparatus. The image forming apparatus is constituted by a main body of the image forming apparatus including an image reader 200 and a printer unit 300, a folder 500 and a finisher 600. An original feeding apparatus 100 is mounted on the image reader 200.

In the original feeding apparatus 100, originals set on an original tray 105 are fed one by one successively from a first page to a last page, and the fed original is conveyed onto a platen glass 205 through a curved path. The original is read by shifting the original on a scanner unit 206 from left to right. Thereafter, the read original is discharged onto a discharge tray 106.

An image on the original read by an image sensor 208 through a lens 207 is subjected to image processing and then is stored in a hard disk 413 (refer to FIG. 3) and is sent to an exposure control unit 305 through a printer control unit 301. The exposure control unit 305 outputs a laser beam in response to an image signal. When the laser beam is illuminated on a photosensitive drum 306, an electrostatic latent image is formed on the photosensitive drum 306. The electrostatic latent image formed on the photosensitive drum 306 is developed by a developing device 307, and developer (developed image) on the photosensitive drum 306 is transferred, at a transfer portion 312, onto a sheet fed from any of a cassette 308, a cassette 309, a manual insertion sheet feeding portion 310 and a both-face convey path 311.

When the sheet to which the developer was transferred is sent to a fixing unit 313, developer fixing processing is performed. After the sheet is passed through the fixing unit 313, the sheet is temporarily directed from a path 351 to a path 314 by a flapper (not shown), and, after a trailing end of the sheet leaves the path 315, the sheet is switched back to direct the sheet from a path 316 to a pair of discharge rollers 317. In this way, the sheet can be discharged out of the printer unit 300 by the pair of discharge rollers 317 with the imaged surface (to which the developer was transferred) facing downwardly (face-down). This is referred to as reversal discharging.

By discharging the sheet in the face-down fashion in this way, when the original feeding apparatus 100 is used or when images outputted from an external computer are printed out, the images can be formed in a proper order from the first page.

Incidentally, when the image formation is effected on a hard sheet such as an OHP sheet sent from the manual insertion sheet feeding portion 310, the sheet is discharged by the pair of discharge rollers 317 with the imaged surface facing upwardly (face-up) without directing the sheet into the path 315.

Further, when images are formed on both surfaces of the sheet, the sheet is directed from the fixing unit 313 to the paths 315 and 314, and, immediately after the trailing end of the sheet leaves the path 315, the sheet is switched back and then is directed to the both-face convey path 311 by a flapper (not shown). Regarding the sheet directed to the both-face convey path 311, an electrostatic latent image (developed image) is transferred onto the sheet again at the transfer portion 312 and the image is fixed at the fixing unit 313.

The sheet discharged by the pair of discharge rollers 317 is sent to the folder 500. The folder 500 performs processing for folding the sheet in a Z-fold fashion. When the folding processing is instructed regarding a large sheet having A3 size or B4 size, after the folding processing is effected in the folder 500, the sheet is sent to the finisher 600. However, other sheets are sent to the finisher 600 as they are. The finisher 600 performs bookbinding processing, stapling processing and perforating processing. Further, an inserter 700 is provided on the finisher 600 to feed a front cover or front/back cover to the finisher 600.

Figure 2:
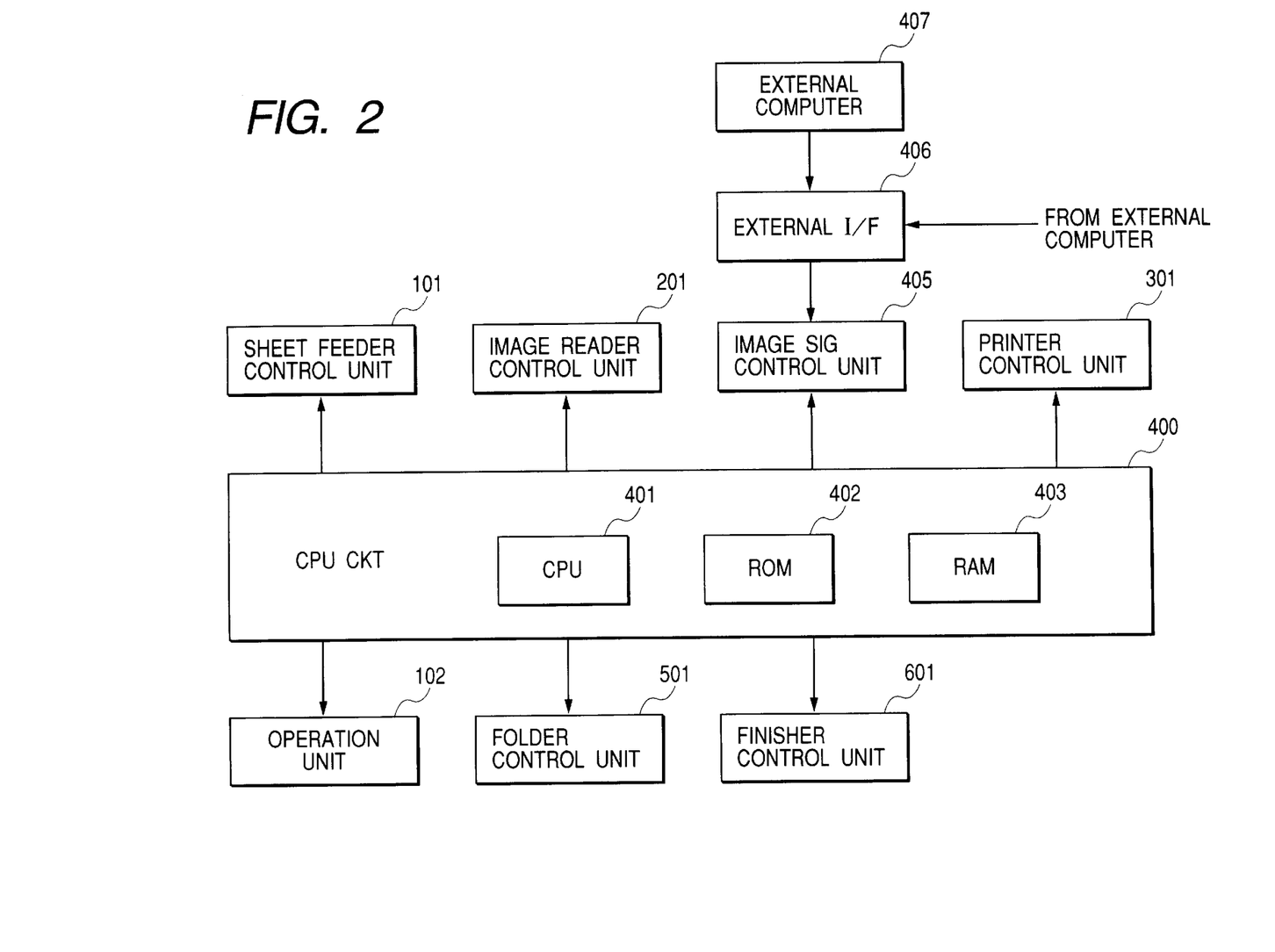
FIG. 2 is a block diagram showing a construction of a control unit of the image forming apparatus.

FIG. 2 is a block diagram showing a construction of a control unit of the image forming apparatus. The control unit for controlling the entire image forming apparatus is mainly constituted by a CPU circuit 400. The CPU circuit 400 includes a CPU 401, a ROM 402 and a RAM 403.

The CPU circuit 400 controls a sheet feeder control unit 101 for controlling the original feeding apparatus 100, an image reader control unit 201 for controlling the image reader 200, an image signal control unit 405, a printer control unit 301 for controlling the printer unit 300, a folder control unit 501 for controlling the folding device 500, a finisher control unit 601 for controlling the finisher 600, and an external interface (I/F) 406, in accordance with the setting in an operation unit 102 and a program stored in the ROM 402 and executed by the CPU 401.

The RAM 403 is used as an area for temporarily storing control data and a work area for effecting calculation regarding the control. The external I/F 406 is an interface to an external computer 407 and serves to develop print data from the external computer 407 as an image and output the image to the image signal control unit 405.

The image reader control unit 201 serves to output the image read by the image reader 208 to the image signal control unit 405, and image data outputted from the image signal control unit 405 to the printer control unit 301 is inputted to the exposure control unit 305.

Figure 3:
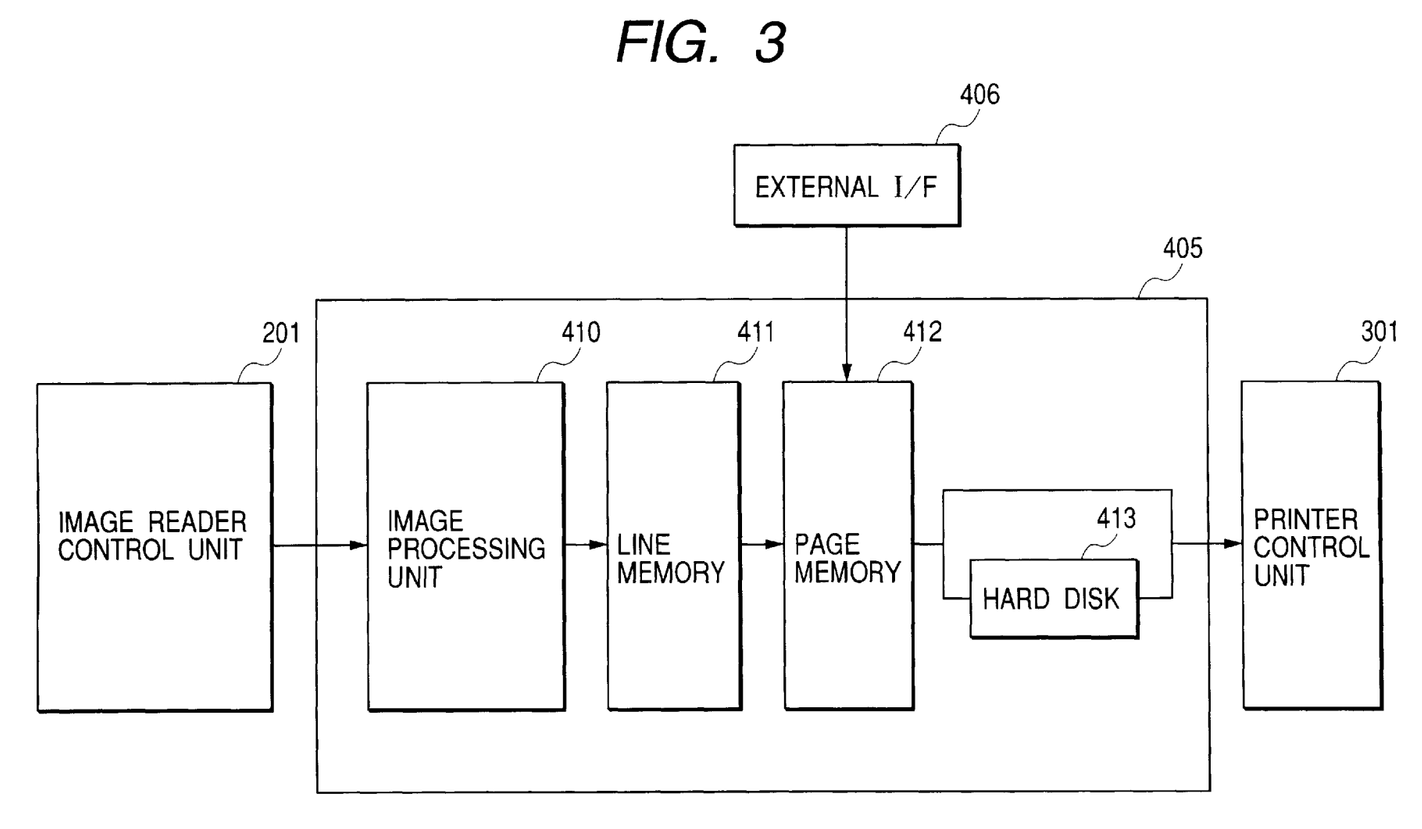
FIG. 3 is a block diagram showing a construction of an image signal control unit 405.

FIG. 3 is a block diagram showing a construction of the image signal control unit 405. The image signal control unit 405 includes an image processing unit 410, a line memory 411, a page memory 412 and a hard disk 413. In the image processing unit 410, image correction processing and edition processing in accordance with the setting in the operation unit 102 are effected. In the line memory 411, mirror image processing for changing the image in a main scanning direction is effected. The image from the line memory 411 is outputted to the printer control unit 301 via the page memory 412. Further, as will be described later, the hard disk 413 is used when the page order to be printed is changed, if necessary, and the images of the page memory 412 are stored in the hard disk.

Figure 4:
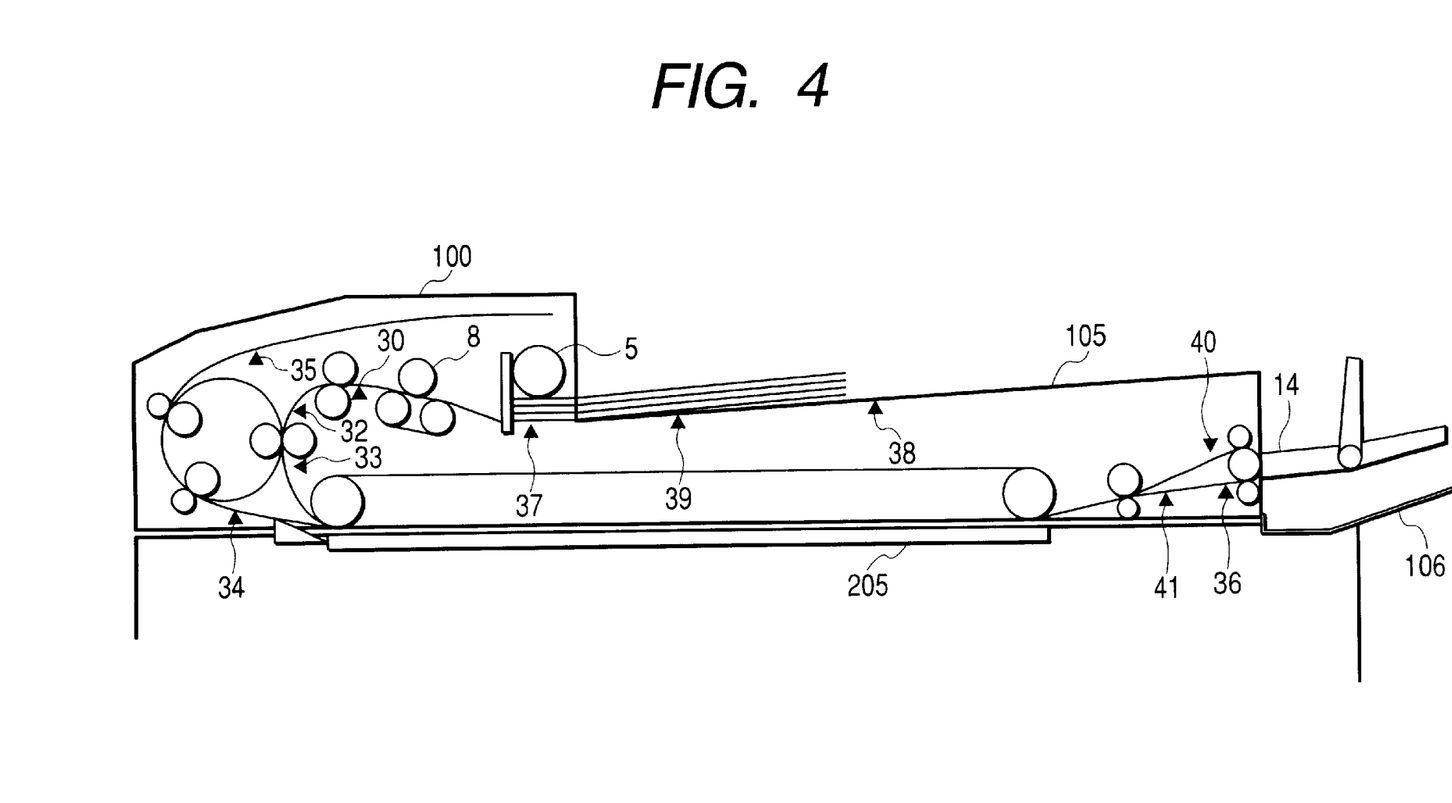
FIG. 4 is a view showing a sensor arrangement of an original feeding apparatus.
Figure 5:
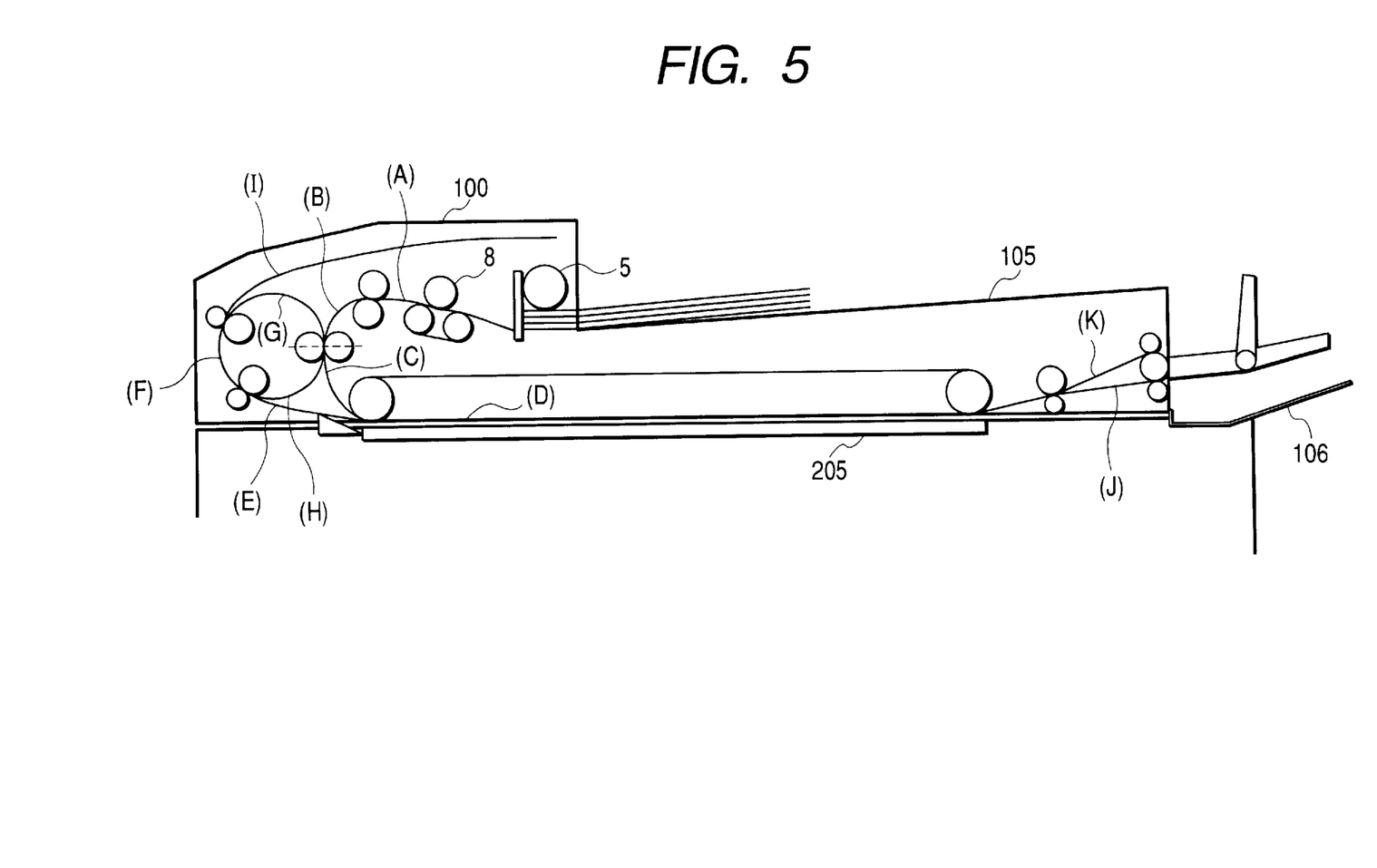
FIG. 5 is a view showing a construction of a convey path of the original feeding apparatus.
Figure 6:
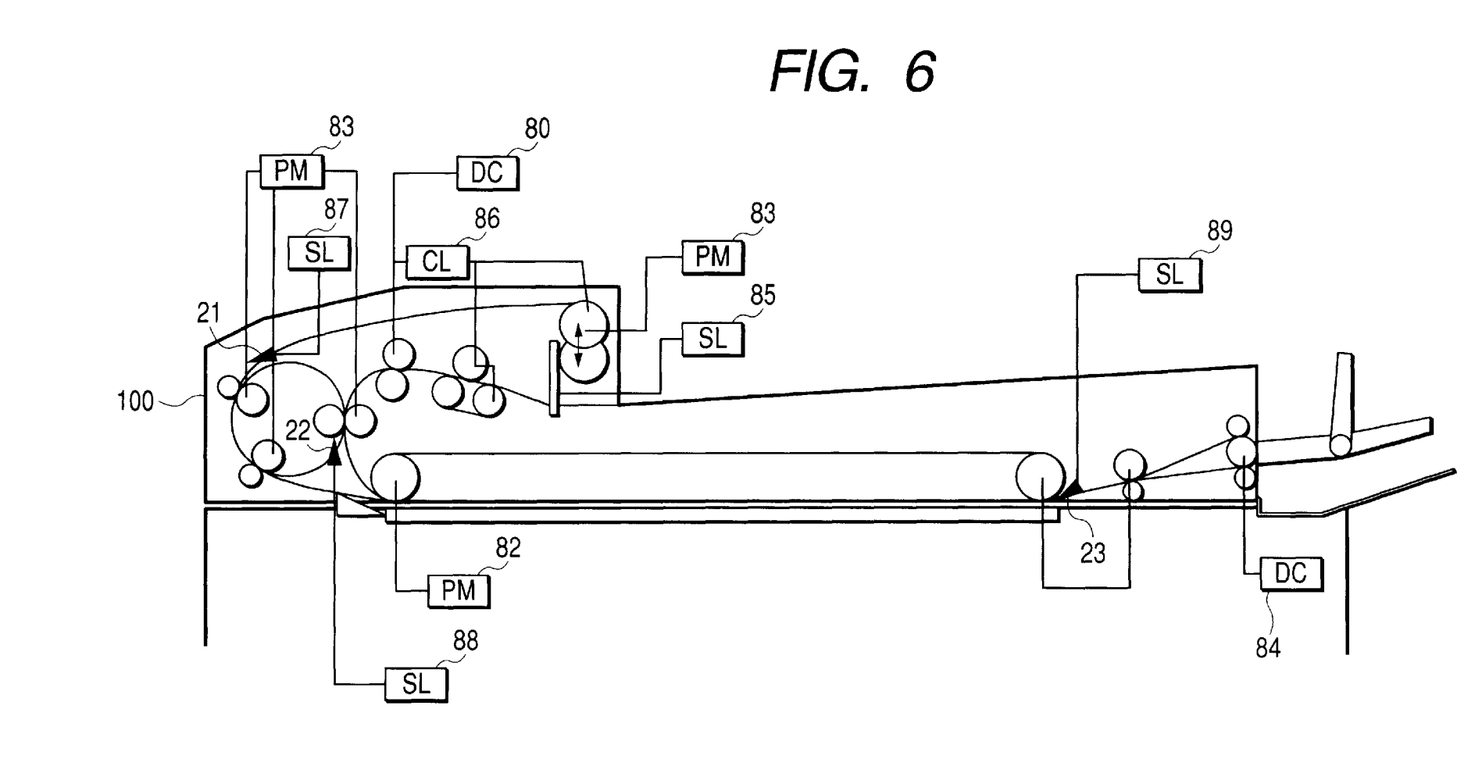
FIG. 6 is a view showing a construction of a driving system of the original feeding apparatus.

FIGS. 4 to 6 are views showing a construction of the original feeding apparatus 100. By driving a rocking motor 83, a sheet feeding roller 5 lowered onto an upper surface of an uppermost one of originals stacked on the original tray 105 with front surfaces of originals facing upwardly (face-up). By driving a separation motor 80, the sheet feeding roller 5 and a separation convey roller 8 are driven to convey the originals to a reading position of the platen glass 205 one by one from an uppermost original of the original stack.

Between the original tray 105 and the platen glass 205, there is provided an original convey paths (A), (B) and (C). These original convey paths (A), (B) and (C) are curved (downwardly) to be connected to an original convey path (D) on the platen glass 205. The original convey path (A) is a path through which the original separated at a separation portion is conveyed in a downstream direction by the separation convey roller 8. Reversal convey paths (H), (F) and (I) extend from the original convey path (B). The reversal convey paths (H), (F) and (I) are used for reversing the original from a front side to a back side before the original is conveyed to the platen glass. The original reversed in the reversal convey paths (H), (F) and (I) is switched back and conveyed to the platen glass 205 through an original discharge path (E).

In case of a one-face original mode, the original is conveyed through the original convey paths (B), (C) and (D). In case of a both-face mode, after the original is conveyed from the original convey path (B) to the reversal convey paths (H), (F) and (I), the original is conveyed to the original paths (E) and (D). In this way, a condition that a back surface of the original which was set on the original tray 105 can be read is established. After the original convey path (B), by switching a pre-reversal flapper 22 by driving a pre-reversal flapper solenoid 88, the original is directed to the convey path (C) or the convey path (H). Further, an original reversal path (G) is branched from the reversal convey path (F) and is joined to the original convey path (B). By utilizing the convey paths (E), (F), (G) and (C), the original from the platen glass 205 can be switched back and reversed and then be returned onto the platen glass 205 again.

In the both-face original mode, after the back surface was read, when the original is reversed to read the front surface, the original is directed through the convey paths (E), (F), (G) and (C). After the convey path (F), by switching a reversal flapper 21 by driving a reversal flapper solenoid 87, the original is directed to the convey path (I) or the convey path (G). After the image reading is finished, the original on the platen glass 205 is discharged onto the discharge tray 106 through the original convey path (D) on the platen glass 205 and an original discharge path (J). In order to direct the original from the original convey path (D) on the platen glass 205 to the original discharge path (J), the original must be dipped up from the platen glass 205. To this end, a discharge flapper 23 is lowered by driving a discharge flapper solenoid 89.

An openable/closable manual insertion original tray 14 is disposed at a right side of the original feeding apparatus 100.

An original (single original) set on the manual insertion original tray 14 can be fed to the platen glass 205 through a manual insertion convey path (K).

After the image reading is finished, the original on the platen glass 205 is discharged onto the discharge tray 106 through the original convey path (D) on the platen glass 205 and the original discharge path (J).

Figures 7, 7A:
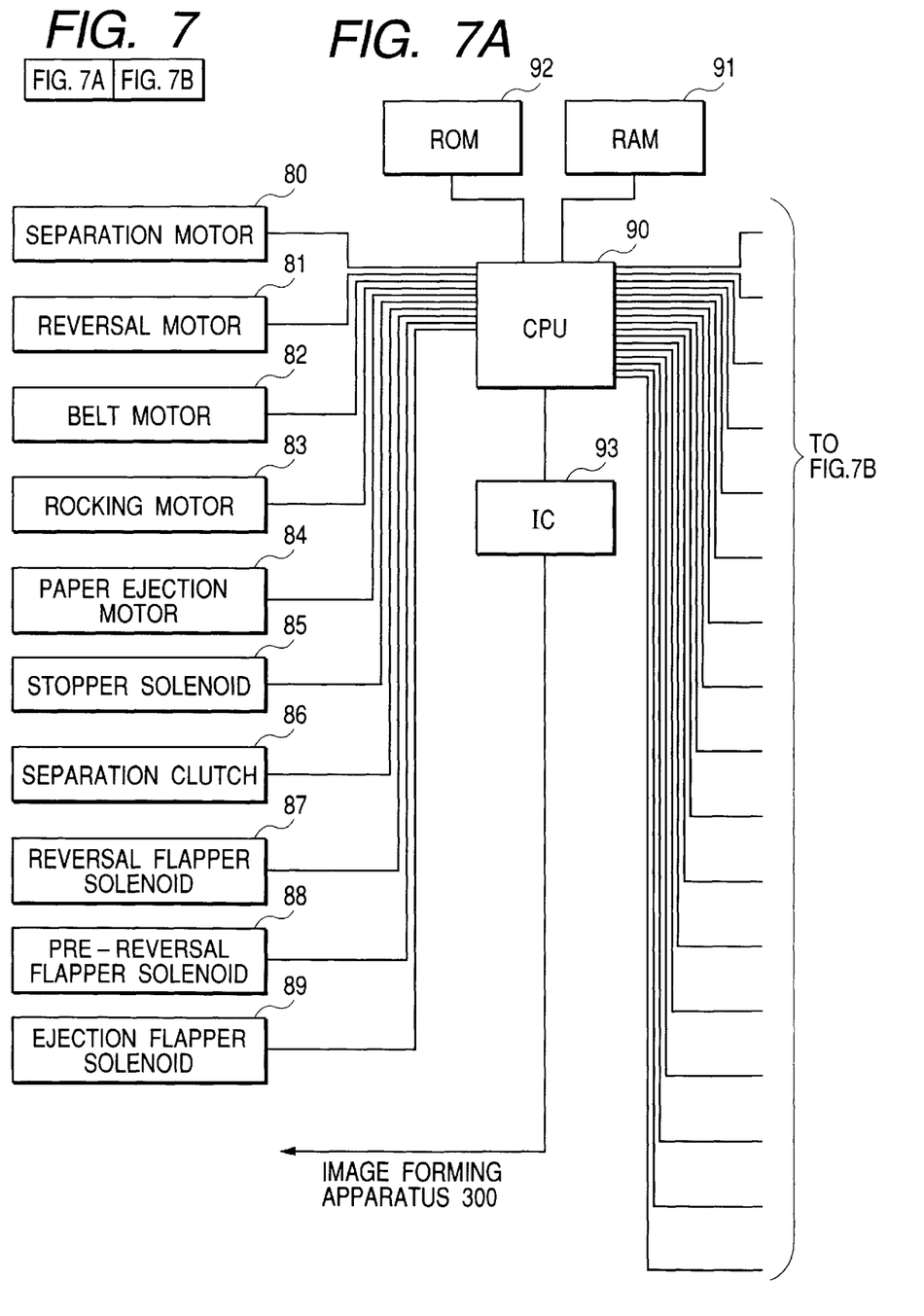
FIG. 7 which is comprised of FIGS. 7A and 7B is a block diagram of the original feeding apparatus.
Figure 7B:
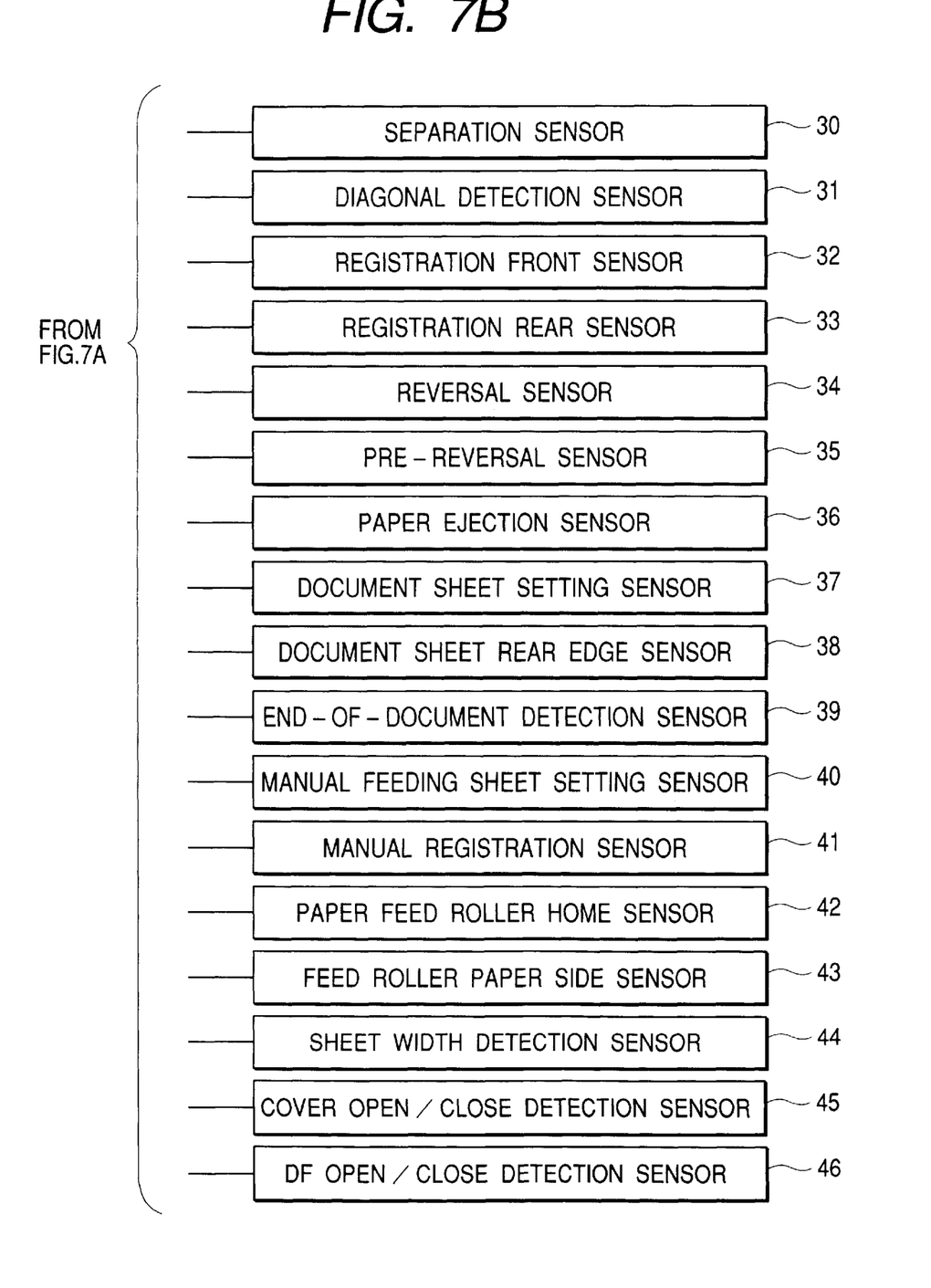

FIGS. 7A and 7B are block diagrams showing a circuit arrangement of the original feeding apparatus 100. The original feeding apparatus 100 includes a CPU 90, a RAM 91, a ROM 92 in which control sequence software is stored, and a communication IC 93 for controlling data communication with the image forming apparatus 300. The entire original feeding apparatus 100 is operated on the basis of data from the image forming apparatus through the communication IC 93, and a condition of the original feeding apparatus 100 is always transmitted. Driver circuits for various loads and sensor signals are connected to I/O ports of the CPU 90.

In the illustrated embodiment, driving of the separation motor (DC brush motor) 80 is controlled by a driver (not shown) and a controller (not shown). A reference clock for determining number of revolutions of the motor and an ON/OFF signal are inputted to the controller from the CPU 90.

A reversal motor (stepping motor) 81 and a belt motor (stepping motor) 82 are driven with constant current by stepping drivers (not shown). A phase exciting signal and a motor current control signal are inputted to each driver from the CPU 90.

The rocking motor (stepping motor) 83 is driven with constant voltage by a driver (not shown). Driving of a discharge motor (DC brush motor) 84 is controlled by a driver (not shown) and an FG servo controller (not shown).

A stopper solenoid 85, a separation clutch 86, the reversal flapper solenoid 87, the pre-reversal flapper solenoid 88 and the discharge flapper solenoid 89 are driven by the respective drivers (not shown). All of the drivers are controlled by signals communicated with the I/O ports of the CPU 90.

Further, various sensors such as a separation sensor 30, a diagonal detection sensor 31, a registration front sensor 32, a registration rear sensor 33, a reversal sensor 34, a pre-reversal sensor 35, a paper ejection sensor 36, a document (original) sheet setting sensor 37, a document sheet rear edge (trailing end) detection sensor 38, an end-of-document detection sensor 39, a manual feeding sheet setting sensor 40, a manual registration sensor 41, a paper feed roller home sensor 42, a sheet width detection sensor 44, a cover open/close detection sensor 45 and a DF open/close detection sensor 46 are connected to input ports of the CPU 90 and are used for monitoring performance of the original (document) and performance of various loads in the apparatus. As shown in FIG. 4, the document sheet setting sensor 37 is provided on the original tray 105 to detect whether the original is rested on the original tray 105 or not. The manual feeding sheet setting sensor 40 is provided on the manual insertion original tray 14 to detect whether the original is rested on the manual insertion original tray 14 or not. Further, the separation sensor 30, diagonal detection sensor 31, registration front sensor 32, registration rear sensor 33, reversal sensor 34, and paper ejection sensor 36 are provided in the original convey paths.

Figure 8:
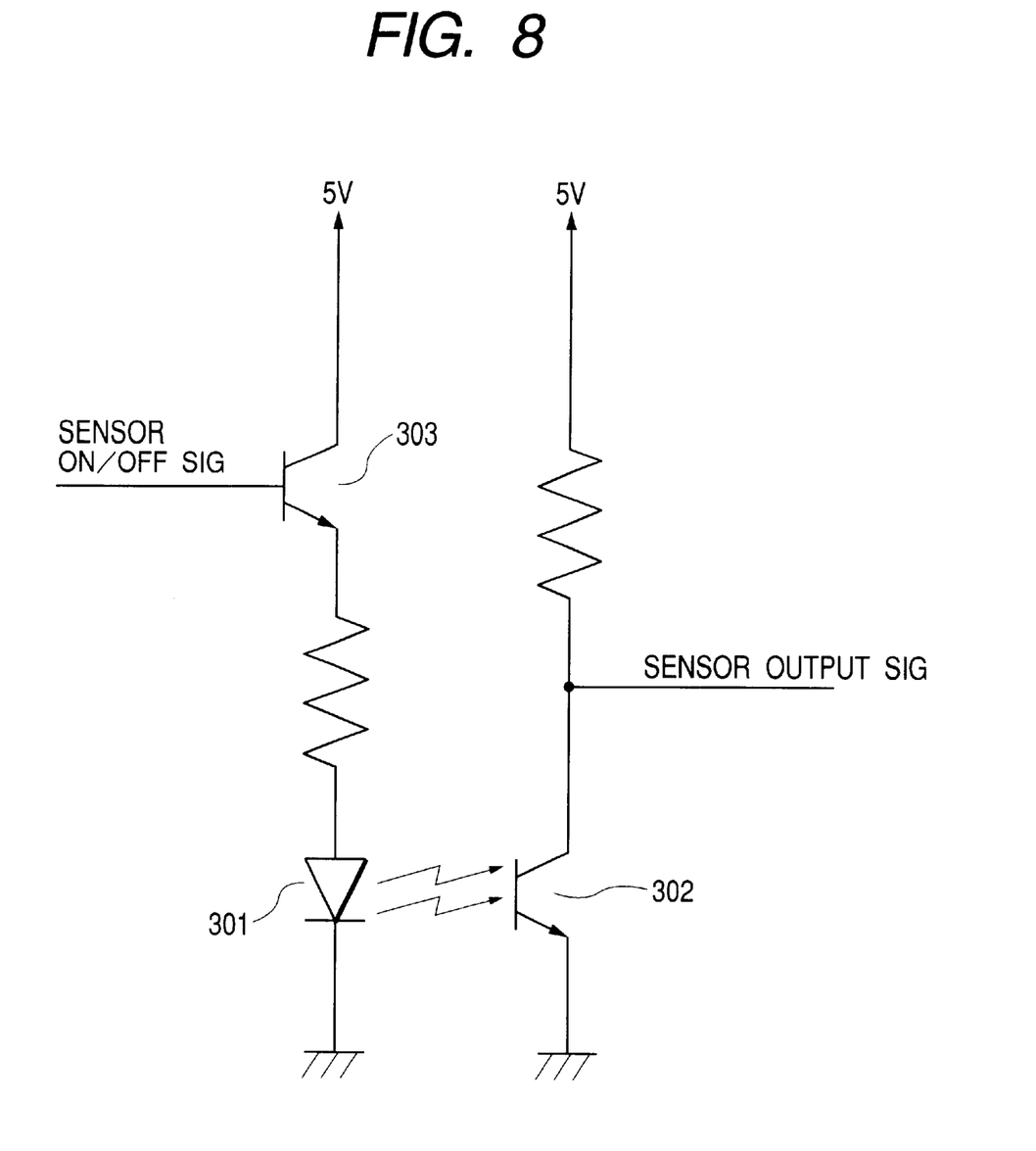
FIG. 8 is a view showing a sensor circuitry of the original feeding apparatus.

FIG. 8 is a view showing a sensor circuit arrangement of the original feeding apparatus 100. The various sensors such as the separation sensor 30, diagonal detection sensor 31, registration front sensor 32, a registration rear sensor 33, reversal sensor 34, paper ejection sensor 36, document (original) sheet setting sensor 37, document sheet rear edge (trailing end) detection sensor 38, end-of-document detection sensor 39, manual feeding sheet setting sensor 40, paper feed roller home sensor 42, sheet width detection sensor 44, cover open/close detection sensor 45 and DF open/close detection sensor 46 are constituted by a circuit shown in FIG. 8. Each sensor includes an LED (light emitting element) 301 and a phototransistor (light receiving element) 302. ON/OFF of the transistor 303 is controlled by output of a sensor ON/OFF signal connected to the output port of the CPU 90, so that energization and disenergization of the light emitting element are switched. Namely, if the output of the ON/OFF signal is OFF, the LED (light emitting element) 301 does not emit light, and, in this case, the CPU 90 neglects the input signal from the sensor.

However, the CPU always outputs the ON signals to the document sheet setting sensor 37 and the manual feeding sheet setting sensor 40 to cause the light emitting elements thereof to emit lights always. In spite of the fact that the CPU 90 outputs the ON signals to the document sheet setting sensor 37 and the manual feeding sheet setting sensor 40, the CPU turns off the ON/OFF signals regarding at least the separation sensor 30, diagonal detection sensor 31, registration front sensor 32, registration rear sensor 33, reversal sensor 34, and paper ejection sensor 36, thereby making these sensors to detection impossible conditions. If it is judged that the original is set on the basis of the sensor output signal from the document sheet setting sensor 37 or the manual feeding sheet setting sensor 40, the CPU 90 turns on the ON/OFF signals regarding at least the separation sensor 30, diagonal detection sensor 31, registration front sensor 32, registration rear sensor 33, reversal sensor 34, and paper ejection sensor 36, thereby switching all of the sensors other than the above-mentioned ones from the detection impossible condition to the detection possible condition. If the operation is not started and the original is set as it is, the ON/OFF signals continue to be turned on. Incidentally, when the power supply of the original feeding apparatus 100 is turned on, although the driving parts of the original feeding apparatus 100 (separation motor 80, reversal motor 81, belt motor 82, rocking motor 83, discharge motor 84, stopper solenoid 85, separation clutch 86, reversal flapper solenoid 87, pre-reversal flapper solenoid 88 and discharge flapper solenoid 89) are initialized. But, when the ON/OFF signal is changed to ON, since the initialization of the driving parts of the original feeding apparatus 100 is not effected, noise can be prevented and the apparatus can be operated for a short time.

In response to the fact that all of the originals set on the tray were discharged onto the discharge tray 106 after the reading of the image of the original set on the original tray 105 or the manual insertion original tray 14 was started, the ON/OFF signals for at least the separation sensor 30, diagonal detection sensor 31, registration front sensor 32, registration rear sensor 33, reversal sensor 34, and paper ejection sensor 36 are turned off. Thereby stopping the energization of the sensor light emitting elements (establishing the detection impossible condition). Further, in response to the fact that the reading operation was not being effected after the original was set on the tray and thus the document sheet setting sensor 37 or the manual feeding sheet setting sensor 40 is turned OFF not to detect the original, the ON/OFF signals for at least the separation sensor 30, diagonal detection sensor 31, registration front sensor 32, registration rear sensor 33, reversal sensor 34, and paper ejection sensor 36 are turned off. Thereby stopping the energization of the sensor light emitting elements (establishing the detection impossible condition).

As mentioned above, by turning off the ON/OFF signals for at least the separation sensor 30, diagonal detection sensor 31, registration front sensor 32, registration rear sensor 33, reversal sensor 34, and paper ejection sensor 36 thereby to disenergize the sensor light emitting elements (establish the detection impossible condition), service lives of the sensors can be extended, thereby reducing the power consumption. Incidentally, by replacing the ON/OFF signals by variable analogue values so that the analogue value when the OFF condition is satisfied becomes smaller than the analogue value when the ON condition is satisfied, the light emitting amount of the sensor light emitting element can be reduced, thereby extending the service life of the sensor and reducing the power consumption.

Further, when the image of the image set on the platen glass 205 (rather than the original conveyed from the original feeding apparatus 100) is read by the image reader 200 (book mode), after the reading is finished, it may be judged whether the original on the platen glass 205 is removed or not on the basis of opening/closing of the original feeding apparatus 100. In a condition that the original is not set in the original feeding apparatus 100 and the opening/closing condition cannot be detected by the open/close detection sensor 46, the above-mentioned judgement cannot be effected, so that similar to the document sheet setting sensor 37, in the open/close sensor 46, the sensor light emitting element is always energized to permit the detection of the opening/closing condition. The detected opening/closing condition of the original feeding apparatus is always informed to the image forming apparatus 300 through the communication IC 93.

As another embodiment, not only the document sheet setting sensor 37, but also the document sheet rear edge detection sensor 38 and the end-of-document detection sensor 39 may always be in the condition that the presence/absence of the original can be detected by these sensors, so that, when the presence of the original is detected by either of the sensors, the ON/OFF signal may be turned on to switch all of the sensors to the detection possible condition. Further, when the absence of the original is detected by all of the sensors, the ON/OFF signals may be turned off to switch other sensors to the detection impossible condition.

What is claimed is:

1. A sheet feeding apparatus comprising:
   a first detector capable of being electrically switched between a detection possible condition that the presence/absence of a sheet can be detected and a detection impossible condition that the presence/absence of a sheet cannot be detected;
   a second detector capable of being electrically switched between the detection possible condition and the detection impossible condition; and
   a controller for controlling said first and second detectors to be in the detection possible condition and for controlling said first detector to be in the detection possible condition and the second detector to be in the detection impossible condition.

2. An original feeding apparatus comprising:
   a first detector capable of being electrically switched between a detection possible condition that the presence/absence of an original can be detected and a detection impossible condition that the presence/absence of an original cannot be detected;
   a second detector capable of being electrically switched between the detection possible condition and the detection impossible condition; and
   a controller for controlling said first and second detectors to be in the detection possible condition and for controlling said first detector to be in the detection possible condition and the second detector to be in the detection impossible condition.

3. An original feeding apparatus according to claim 2, further comprising an original tray on which the original is rested, and wherein said first detector detects whether the original is rested on said original tray or not.

4. An original feeding apparatus according to claim 3, further comprising a discharge tray on which the original fed from said original tray and subjected to image reading is rested, and a convey path through which the original is conveyed from said original tray to said discharge tray, and wherein said second detector is provided in said convey path.

5. An original feeding apparatus according to claim 3, wherein said controller controls said first and second detectors to be in the detection possible condition in response to a presence of the original being detected by said first detector in a case where said first detector is in the detection possible condition and said second detector is in the detection impossible condition.

6. An original feeding apparatus according to claim 5, further comprising a discharge tray on which the original fed from said original tray and subjected to image reading is rested, and wherein, after said second detector is changed to the detection possible condition, said controller changes said second detector to the detection impossible condition in response to the fact that absence of the original is detected by said first detector before an image reading operation is started.

7. An original feeding apparatus according to claim 5, further comprising a discharge tray on which the original fed from said original tray and subjected to image reading is rested, and wherein, after said second detector is changed to the detection possible condition, said controller changes said second detector to the detection impossible condition in response to the fact that all originals rested on said original tray are discharged onto said discharge tray.

8. An original feeding apparatus according to claim 2, wherein said second detector includes a light emitting element and a light receiving element, and said controller stops light emitting of said light emitting element when it changes said second detector to the detection impossible condition.

9. An original feeding apparatus according to claim 2, wherein said second detector includes a light emitting element and a light receiving element, and said controller reduces a light emitting amount of said light emitting element when it changes said second detector to the detection impossible condition.

10. An original feeding apparatus according to claim 2, further comprising a third detector for detecting an opening/closing condition of said original feeding apparatus, and wherein said third detector always detects the opening/closing condition regardless of the detection of the original by means of said first detector and informs an image forming apparatus of a detected result.

11. An original feeding apparatus according to claim 2, wherein said first detector includes a light emitting element and a light receiving element.

12. An original feeding apparatus according to claim 11, wherein said light emitting element is an LED and said light receiving element is a phototransistor.

13. An original feeding apparatus according to claim 2, wherein said second detector includes a plurality of sensors.

* * * * *